US009292077B2

(12) United States Patent
Tiedemann et al.

(10) Patent No.: US 9,292,077 B2
(45) Date of Patent: Mar. 22, 2016

(54) METHODS AND APPARATUS FOR EFFICIENT SERVICE LAYER ASSISTANCE FOR MODEM SLEEP OPERATIONS

(71) Applicant: Qualcomm Incorporated, San Diego, CA (US)

(72) Inventors: Edward George Tiedemann, San Diego, CA (US); Dilip Krishnaswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 13/734,808

(22) Filed: Jan. 4, 2013

(65) Prior Publication Data
US 2014/0195836 A1 Jul. 10, 2014

(51) Int. Cl.
*G06F 1/32* (2006.01)
*H04W 52/02* (2009.01)
*H04W 4/00* (2009.01)

(52) U.S. Cl.
CPC ............. *G06F 1/3278* (2013.01); *H04W 4/005* (2013.01); *H04W 52/0229* (2013.01); *H04W 52/0258* (2013.01)

(58) Field of Classification Search
CPC  G06F 1/3278; H04W 4/005; H04W 52/0229; H04W 52/0258
See application file for complete search history.

(56) References Cited

U.S. PATENT DOCUMENTS 5,095,308 A * 3/1992 Hewitt .......................... 340/7.38
7,912,518 B2 3/2011 Uh et al.
8,937,880 B2 * 1/2015 Ding ............................. 370/252
2008/0081647 A1 * 4/2008 Lee et al. ...................... 455/466
2011/0045818 A1 2/2011 Banks et al.
2011/0134841 A1 6/2011 Shaheen
2011/0140846 A1 6/2011 Blanz et al.
2011/0307694 A1 12/2011 Broustis et al.
2012/0057476 A1 3/2012 Chan et al.
2012/0231828 A1 9/2012 Wang et al.

FOREIGN PATENT DOCUMENTS

WO    2013114109 A1    8/2013

OTHER PUBLICATIONS

International Search Report and Written Opinion—PCT/US2013/077110—ISA/EPO—Jun. 4, 2014.

* cited by examiner

*Primary Examiner* — Stefan Stoynov
(74) *Attorney, Agent, or Firm* — Jimmy Cheng

(57) ABSTRACT

A method, an apparatus, and a computer program product for wireless communication are provided in connection with improving wireless device power consumption in an M2M environment. In an example, a service layer module equipped to obtain a network value indicating that a service layer transaction is complete and no additional activity associated with the service layer transaction is expected from a network entity, determine that no additional activity associated with the service layer transaction is expected from a wireless device application, generate a sleep mode value based on the reception of the network value and upon the determination, and provide the sleep mode value to a modem subsystem and/or an application subsystem indicating that it is allowed to enter a sleep mode. In an aspect, the sleep mode value may be provided using cross layer signaling between a service layer and modem processing layer.

72 Claims, 12 Drawing Sheets

METHODS AND APPARATUS FOR EFFICIENT SERVICE LAYER ASSISTANCE FOR MODEM SLEEP OPERATIONS

BACKGROUND

1. Field

The present disclosure relates generally to communication systems, and more particularly, to improving service layer transactional closure to assist in sleep-mode entry for a wireless modem.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

A form of communications used in a 3GPP based access network is machine-to machine (M2M) communications. Generally, devices communicating machine-to machine (M2M) (e.g., M2M devices) may communicate small amounts of data. During data communications, the M2M device modem subsystem is active. As the small amounts of data may be communicated in a realizing short duration, the M2M device may unnecessarily consume power through keeping the modem subsystem active after the M2M communication is complete. Additionally, unnecessary power consumption may occur when a modem subsystem enters a sleep mode where there is data pending to be communicated.

Therefore, methods and apparatuses are needed to efficiently determine whether any pending transactions are complete so as to allow the modem subsystem to enter a sleep mode.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving wireless device power consumption in an M2M environment. In an example, a service layer module equipped to obtain a network value indicating that a service layer transaction is complete and no additional activity associated with the service layer transaction is expected from a network entity, determine whether additional activity associated with the service layer transaction is expected from one or more applications associated with a wireless device, generate a sleep mode value based on the reception of the network value and upon a determination that no additional activity associated with the service layer transaction is expected from the wireless device, and provide the sleep mode value to a modem subsystem and/or an application subsystem indicating that it is allowed to enter a sleep mode. In an aspect, the sleep mode value may be provided using cross layer signaling between a service layer and modem processing layer.

According to related aspects, a method for improving wireless device power consumption in an M2M environment is provided. The method can include determining whether additional activity associated with the service layer transaction is expected from one or more applications associated with a wireless device. Further, the method can include obtaining, by a service layer module, a network value indicating that a service layer transaction is complete and no additional activity associated with the service layer transaction is expected from a network entity. Further, the method can include generating a sleep mode value based on the reception of the network value and upon a determination that no additional activity associated with the service layer transaction is expected from the wireless device. Moreover, the method may include providing the sleep mode value to at least one of a modem subsystem or an application subsystem. In an aspect, the sleep mode value may indicate that the modem subsystem and/or the application subsystem are allowed to enter a sleep mode.

Another aspect relates to a communications apparatus for improving wireless device power consumption in an M2M environment. The communications apparatus can include means for obtaining, by a service layer module, a network value indicating that a service layer transaction is complete and no additional activity associated with the service layer transaction is expected from a network entity. Further, the communications apparatus can include means for determining whether additional activity associated with the service layer transaction is expected from one or more applications associated with a wireless device. Further, the communications apparatus can include means for generating a sleep mode value based on the reception of the network value and upon a determination that no additional activity associated with the service layer transaction is expected from the wireless device. Moreover, the communications apparatus can include means for providing the sleep mode value to at least one of a modem subsystem or an application subsystem. In an aspect, the sleep mode value may indicate that the modem subsystem and/or the application subsystem are allowed to enter a sleep mode.

Another aspect relates to a communications apparatus. The apparatus can include a processing system configured to obtain, by a service layer module, a network value indicating that a service layer transaction is complete and no additional activity associated with the service layer transaction is expected from a network entity. Further, the processing system may be configured to determine whether additional activity associated with the service layer transaction is expected from one or more applications associated with a wireless device. Further, the processing system may be configured to generate a sleep mode value based on the reception of the network value and upon a determination that no additional activity associated with the service layer transaction is expected from the wireless device. Moreover, the processing system may further be configured to provide the sleep mode value to at least one of a modem subsystem or an application subsystem. In an aspect, the sleep mode value may indicate that the modem subsystem and/or the application subsystem are allowed to enter a sleep mode.

Still another aspect relates to a computer program product, which can have a computer-readable medium including code for obtaining, by a service layer module, a network value indicating that a service layer transaction is complete and no additional activity associated with the service layer transaction is expected from a network entity. Further, the computer-readable medium can include code for determining whether additional activity associated with the service layer transaction is expected from one or more applications associated with a wireless device. Further, the computer-readable medium can include code for generating a sleep mode value based on the reception of the network value and upon a determination that no additional activity associated with the service layer transaction is expected from the wireless device. Moreover, the computer-readable medium can include code for providing the sleep mode value to at least one of a modem subsystem or an application subsystem. In an aspect, the sleep mode value may indicate that the modem subsystem and/or the application subsystem are allowed to enter a sleep mode.

According to related aspects, a method for improving wireless device power consumption in an M2M environment is provided. The method can include determining whether a sleep mode value is set to allow a modem to enter a sleep mode. In an aspect, the sleep mode value may indicate a service layer transaction with a network entity is complete and no additional activity associated with the service layer transaction is expected from an application. Moreover, the method may include entering the sleep mode upon a determination that the sleep mode value is set to allow the modem to enter the sleep mode.

Another aspect relates to a communications apparatus for improving wireless device power consumption in an M2M environment. The communications apparatus can include means for determining whether a sleep mode value is set to allow a modem to enter a sleep mode. In an aspect, the sleep mode value may indicate a service layer transaction with a network entity is complete and no additional activity associated with the service layer transaction is expected from an application Moreover, the communications apparatus can include means for entering the sleep mode upon a determination that the sleep mode value is set to allow the modem to enter the sleep mode.

Another aspect relates to a communications apparatus. The apparatus can include a processing system configured to determine whether a sleep mode value is set to allow a modem to enter a sleep mode. In an aspect, the sleep mode value may indicate a service layer transaction with a network entity is complete and no additional activity associated with the service layer transaction is expected from an application. Moreover, the processing system may further be configured to enter the sleep mode upon a determination that the sleep mode value is set to allow the modem to enter the sleep mode.

Still another aspect relates to a computer program product, which can have a computer-readable medium including code for determining whether a sleep mode value is set to allow a modem to enter a sleep mode. In an aspect, the sleep mode value may indicate a service layer transaction with a network entity is complete and no additional activity associated with the service layer transaction is expected from an application. Moreover, the computer-readable medium can include code for entering the sleep mode upon a determination that the sleep mode value is set to allow the modem to enter the sleep mode.

According to related aspects, a method for improving wireless device power consumption in an M2M environment is provided. The method can include receiving, by an intermediate node, data associated with a service layer transaction. In an aspect, the data may be received from a wireless device and may be intended for a network entity. Further, the method can include initiating a connection for transmission of the data to the network entity. Further, the method can include transmitting an indication to the wireless device that the data was reliably received. In an aspect, the indication may allow the wireless device modem to enter a sleep mode. Moreover, the method may include transmitting the data to the network entity using the connection.

Another aspect relates to a communications apparatus for improving wireless device power consumption in an M2M environment. The communications apparatus can include means for receiving, by an intermediate node, data associated with a service layer transaction. In an aspect, the data may be received from a wireless device and may be intended for a network entity. Further, the communications apparatus can include means for initiating a connection for transmission of the data to the network entity. Further, the communications apparatus can include means for transmitting an indication to the wireless device that the data was reliably received. In an aspect, the indication may allow the wireless device modem to enter a sleep mode. Moreover, the communications apparatus can include means for transmitting the data to the network entity using the connection.

Another aspect relates to a communications apparatus. The apparatus can include a processing system configured to receive, by an intermediate node, data associated with a service layer transaction. In an aspect, the data may be received from a wireless device and may be intended for a network entity. Further, the processing system may be configured to initiate a connection for transmission of the data to the network entity. Further, the processing system may be configured to transmit an indication to the wireless device that the data was reliably received. In an aspect, the indication may allow the wireless device modem to enter a sleep mode. Moreover, the processing system may further be configured to transmit the data to the network entity using the connection.

Still another aspect relates to a computer program product, which can have a computer-readable medium including code for receiving, by an intermediate node, data associated with a service layer transaction. In an aspect, the data may be received from a wireless device and may be intended for a network entity. Further, the computer-readable medium can include code for initiating a connection for transmission of the data to the network entity. Further, the computer-readable medium can include code for transmitting an indication to the wireless device that the data was reliably received. In an aspect, the indication may allow the wireless device modem to enter a sleep mode. Moreover, the computer-readable medium can include code for transmitting the data to the network entity using the connection.

According to related aspects, a method for improving wireless device power consumption in an M2M environment is provided. The method can include receiving, by a service layer module, application data that is intended to be communicated to a network entity. In an aspect, the application data may be received from an application at a first time. Further, the method can include buffering the application data. Further, the method can include receiving a request for data from a network entity at a second time. In an aspect, the request may include a network availability value with a flexible time window for transmission, and the network availability value may indicate that the network entity is available to receive the application data. Further, the method can include obtaining the requested data. Further, the method can include establishing a wireless connection with the network entity. Moreover, the method may include transmitting the buffered application data along with the requested data based on the network availability value and within the flexible time window for transmission.

Another aspect relates to a communications apparatus for improving wireless device power consumption in an M2M environment. The communications apparatus can include means for receiving, by a service layer module, application data that is intended to be communicated to a network entity. In an aspect, the application data may be received from an application at a first time. Further, the communications apparatus can include means for buffering the application data. Further, the communications apparatus can include means for receiving a request for data from a network entity at a second time. In an aspect, the request may include a network availability value with a flexible time window for transmission, and the network availability value may indicate that the network entity is available to receive the application data. Further, the communications apparatus can include means for obtaining the requested data. Further, the communications apparatus can include means for establishing a wireless connection with the network entity. Moreover, the communications apparatus can include means for transmitting the buffered application data along with the requested data based on the network availability value and within the flexible time window for transmission.

Another aspect relates to a communications apparatus. The apparatus can include a processing system configured to receive, by a service layer module, application data that is intended to be communicated to a network entity. In an aspect, the application data may be received from an application at a first time. Further, the processing system may be configured to buffer the application data. Further, the processing system may be configured to receive a request for data from a network entity at a second time. In an aspect, the request may include a network availability value with a flexible time window for transmission, and the network availability value may indicate that the network entity is available to receive the application data. Further, the processing system may be configured to obtain the requested data. Further, the processing system may be configured to establish a wireless connection with the network entity. Moreover, the processing system may further be configured to transmit the buffered application data along with the requested data based on the network availability value and within the flexible time window for transmission.

Still another aspect relates to a computer program product, which can have a computer-readable medium including code for receiving, by a service layer module, application data that is intended to be communicated to a network entity. In an aspect, the application data may be received from an application at a first time. Further, the computer-readable medium can include code for buffering the application data. Further, the computer-readable medium can include code for receiving a request for data from a network entity at a second time. In an aspect, the request may include a network availability value with a flexible time window for transmission, and the network availability value may indicate that the network entity is available to receive the application data. Further, the computer-readable medium can include code for obtaining the requested data. Further, the computer-readable medium can include code for establishing a wireless connection with the network entity. Moreover, the computer-readable medium can include code for transmitting the buffered application data along with the requested data based on the network availability value and within the flexible time window for transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
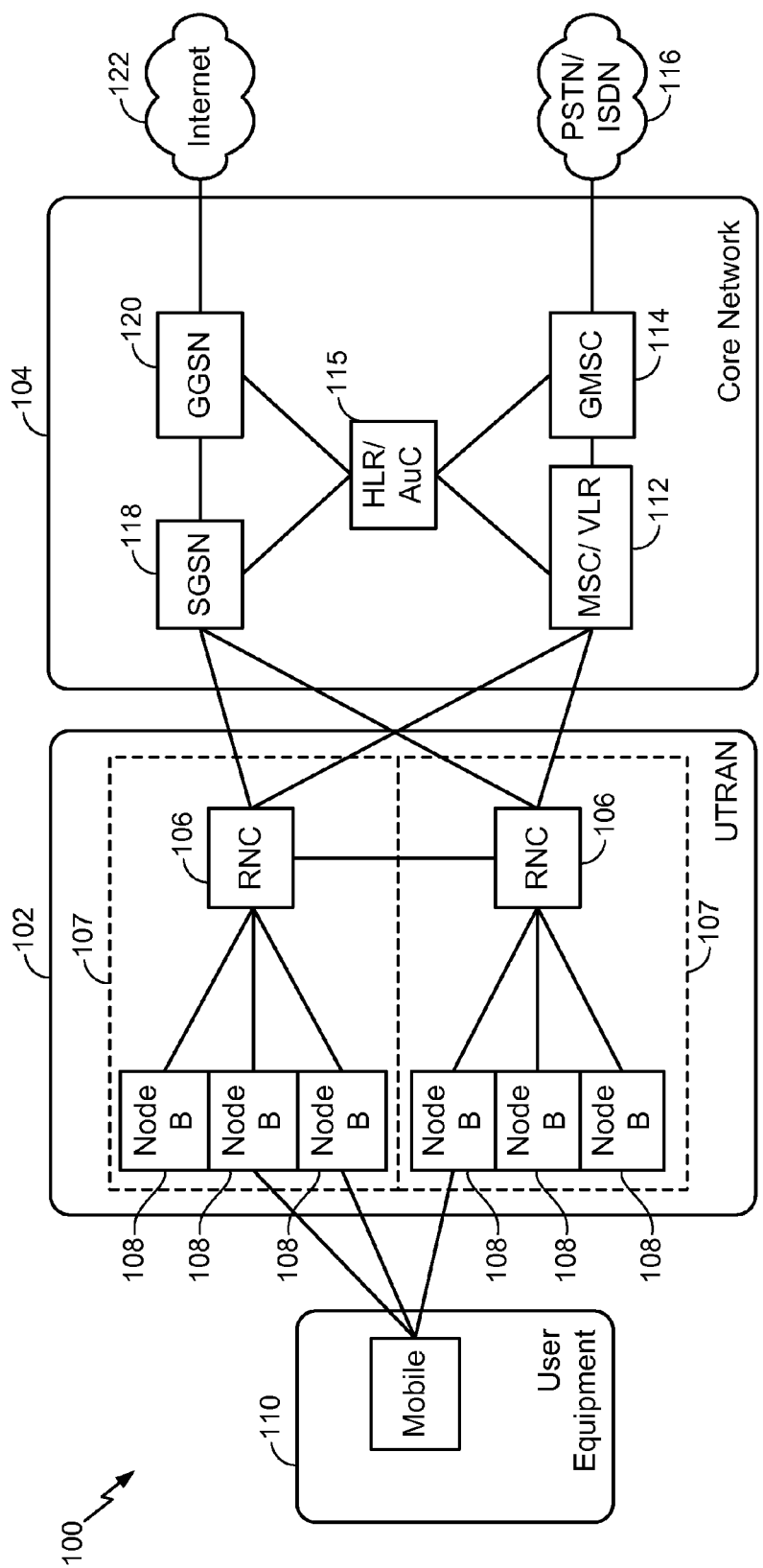
FIG. 1 is a diagram illustrating an example of an access network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

By way of example and without limitation, the aspects of the present disclosure illustrated in FIG. 1 are presented with reference to a UMTS system 100 employing a W-CDMA air interface and/or CDMA2000 air interface. A UMTS network includes three interacting domains: a Core Network (CN) 104, a UMTS Terrestrial Radio Access Network (UTRAN) 102, and User Equipment (UE) 110. In this example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like, using any suitable transport network.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a CN 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. For illustrative purposes, one UE 110 is shown in communication with a number of the Node Bs 108. The DL, also called the forward link, refers to the communication link from a Node B 108 to a UE 110, and the UL, also called the reverse link, refers to the communication link from a UE 110 to a Node B 108.

The CN 104 interfaces with one or more access networks, such as the UTRAN 102. As shown, the CN 104 is a GSM core network. However, as those skilled in the art will recognize, the various concepts presented throughout this disclosure may be implemented in a RAN, or other suitable access network, to provide UEs with access to types of CNs other than GSM networks.

The CN 104 includes a circuit-switched (CS) domain and a packet-switched (PS) domain. Some of the circuit-switched elements are a Mobile services Switching Centre (MSC) 112, a Visitor location register (VLR), and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 may also include a VLR that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The CN 104 also supports packet-data services with a serving General Packet Radio Service (GPRS) support node (SGSN) 118 and a gateway GPRS support node (GGSN) 120. GPRS is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

Figure 2:
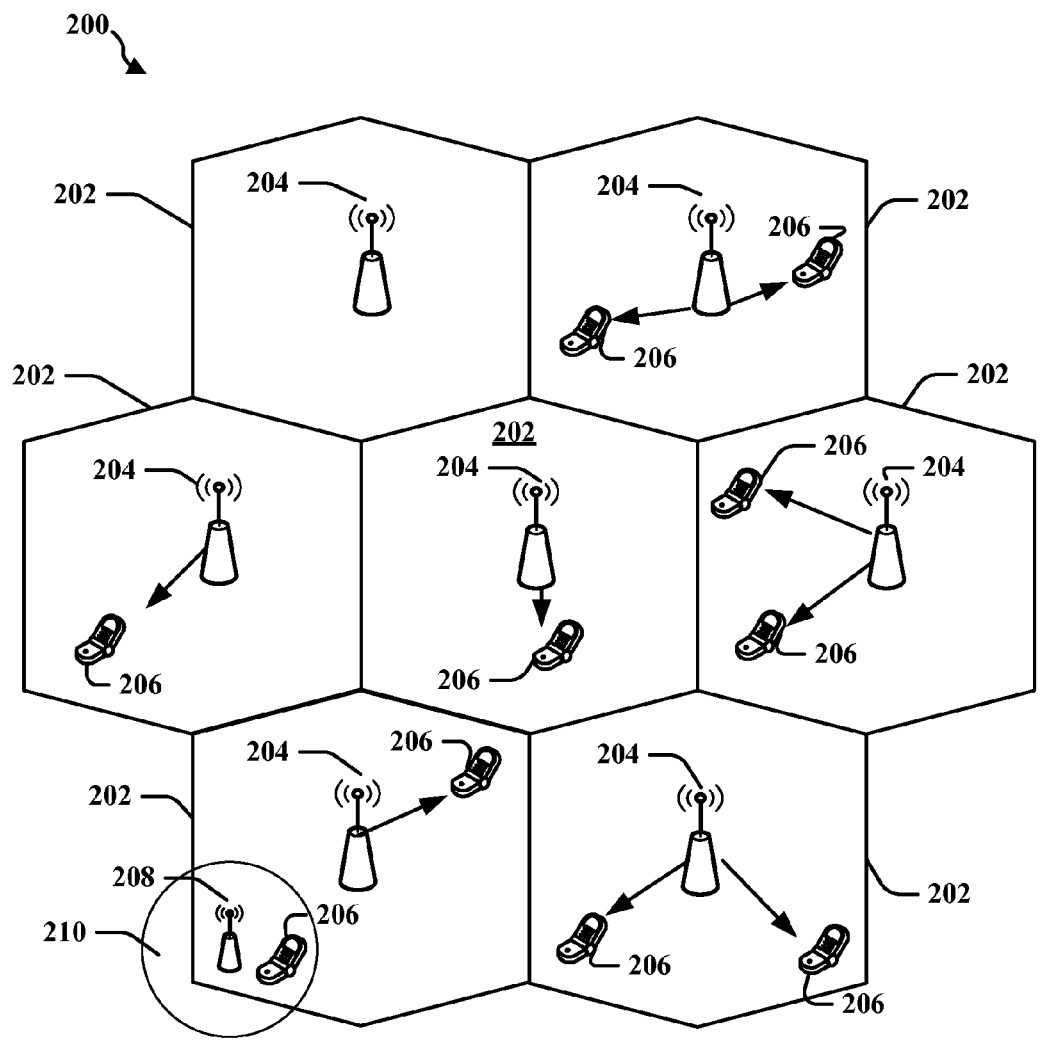
FIG. 2 is a diagram illustrating an example of another access network architecture.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
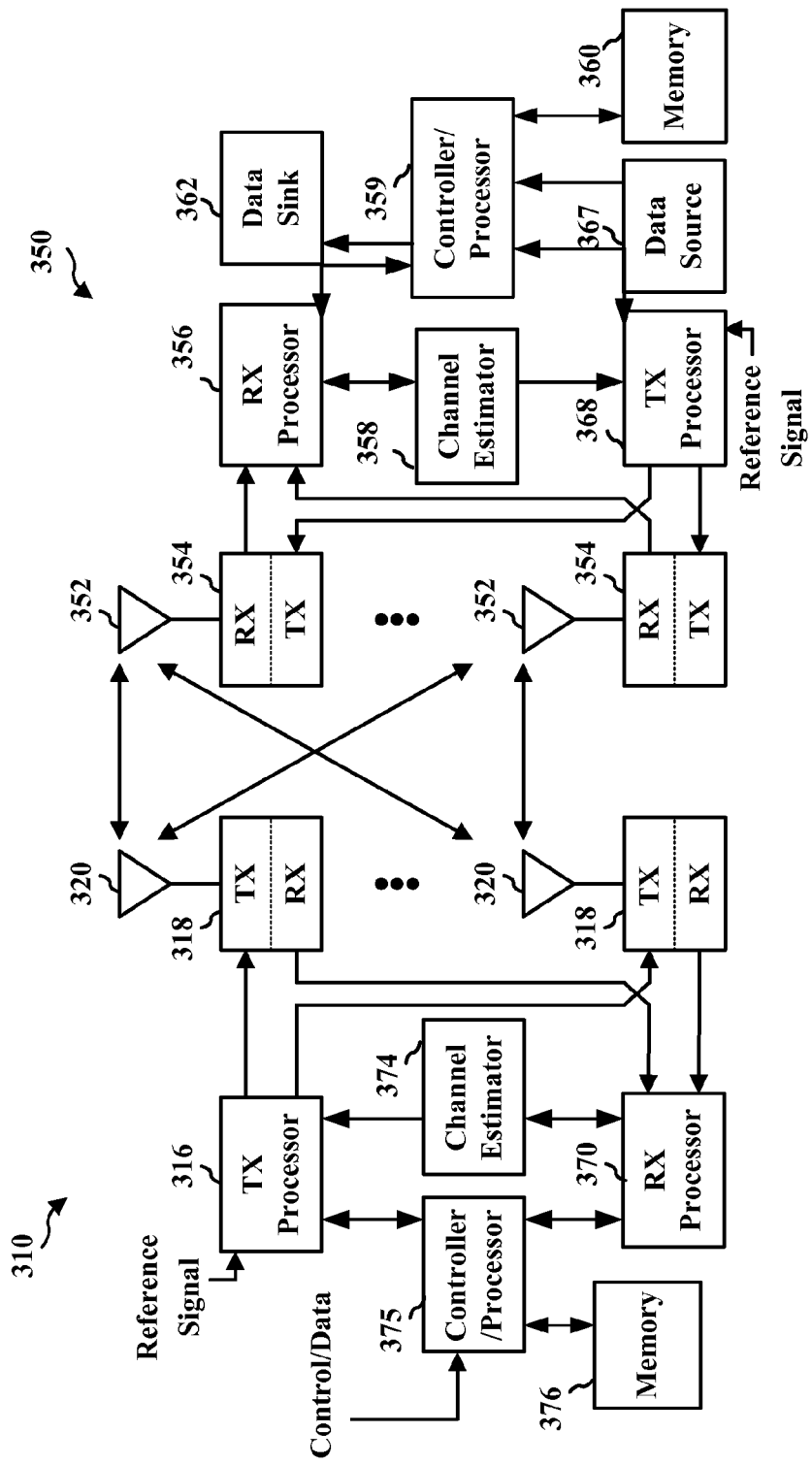
FIG. 3 is a diagram illustrating an example of a network entity and user equipment in an access network.

FIG. 3 is a block diagram of a network entity 310 (e.g., eNB, pico node, a femto node, an MSC, etc.) in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the network entity 310. These soft decisions may be based on channel estimates computed by the channel estimator 358. The soft decisions are then decoded and deinterleaved to recover the data and control signals that were originally transmitted by the network entity 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the network entity 310, the controller/processor 359 implements the L2 layer for the user plane and the control plane by providing header compression, ciphering, packet segmentation and reordering, and multiplexing between logical and transport channels based on radio resource allocations by the network entity 310. The controller/processor 359 is also responsible for HARQ operations, retransmission of lost packets, and signaling to the network entity 310.

Channel estimates derived by a channel estimator 358 from a reference signal or feedback transmitted by the network entity 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the network entity 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
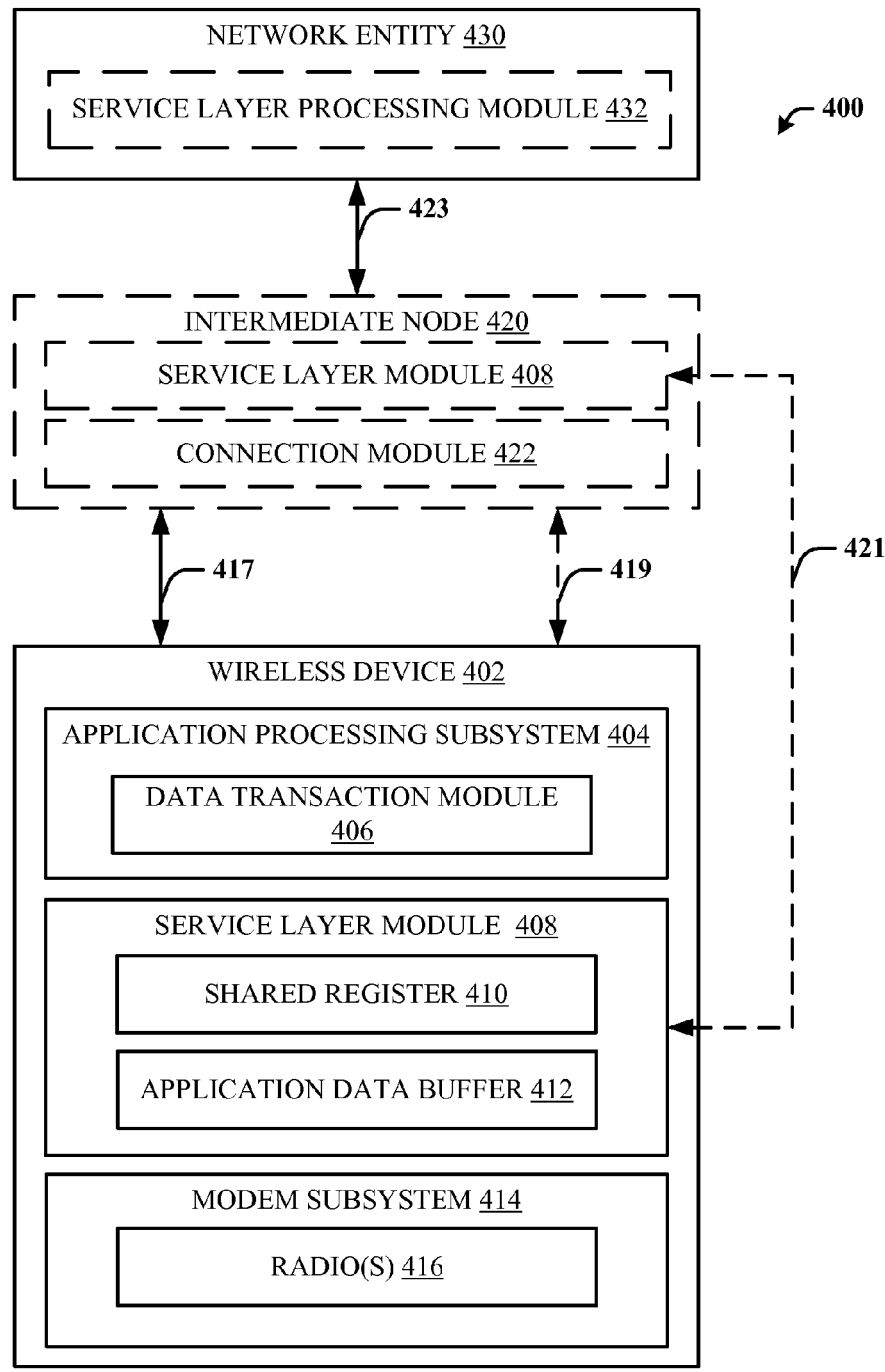
FIG. 4 is a diagram illustrating an example of another access network architecture, according to an aspect.

FIG. 4 depicts an example communication network 400 in which efficient wireless device subsystem operations (e.g., modem, application, etc.) may be enabled, according to an aspect.

Communication network 400 may include a wireless device 402 (e.g., M2M end device, M2M gateway, or M2M client device, etc.), and a network entity 430 (e.g., M2M network node). In an optional aspect, communication network may further include an intermediate node 420 (e.g., a femto node, a pico node, a nodeB, an eNodeB, etc.).

Wireless device 402 may include an application processing subsystem 404, service layer module 408, and modem subsystem 414. In an aspect, application processing subsystem 404 may use data transaction module 406 to obtain data as part of M2M communications. For example, data transaction module 406 may obtain data from one or more sensors associated with wireless device 402. The obtained data may be communicated to network entity 430 as part of a service layer transaction. In another aspect, service layer module 408 indicate to modem subsystem 414 and/or application processing subsystem 404 which either and/or both subsystems may switch to a sleep mode of operations. In one aspect, service layer module 408 may populate a shared register 410 with one or more values that may prompt modem subsystem 414 and/ or application processing subsystem 404 as to whether either and/or both subsystems (e.g., 404, 414) may switch to a sleep mode of operations. Although depicted as a separate module in FIG. 4, service layer module 408 may be associated with and/or coupled to application processing subsystem 404 and/or modem subsystem 414. In another aspect, service layer module 408 may include multiple sub-portions, and a sub-portion may be more closely coupled to the modem subsystem 414. In another aspect, service layer module 408 may be associated with wireless device 402 and intermediate node 420 with a peer-to-peer (P2P) link 421 between the modules 408.

In an optional aspect, data communications between wireless device 402 and network entity 430 may be facilitated through intermediate node 420. In an aspect, intermediate node 420 may include a connection module 422 that is configured to initiate a wireless connection in communication network 400. In an aspect, the wireless connection 417 may be a transmission control protocol (TCP) connection, a user datagram protocol (UDP) connection, etc. In an aspect, intermediate node 420 may receive data from the wireless device 402. Upon a determination of closure with regard to reliability of transfer performed at a lower layer such as a wireless MAC layer or at the RLC or RLP layers in WWAN protocols, modem subsystem 414 may go to sleep. Subsequently, intermediate node 420 TCP connection module 422 may initiate a connection 423 (e.g., using wired backhaul, etc.) to transfer the data reliably to the network entity 430 (e.g., an M2M server on the interna). In an aspect in which the connection 423 is a TCP connection, connection module 422 may manage TCP retransmissions and ACKs with the network entity 430 on behalf of the wireless device 402. In an aspect, the intermediate node 420 may determine which network entity 430 with which to communicate the data through use of information that is set up in advance. For example, if the network entity 430 is a smart grid utility server, then the intermediate node 420 may be aware of the IP address for the smart grid utility server. As such, when the wireless device 402 provides data (e.g., a meter reading with a particular time-stamp), then the intermediate node 420 may set up an HTTP/TCP connection to set up/create a new entry in a database associated with meter readings from that wireless device 402. In an aspect, the intermediate node 420 may use its own IP address, and indicate the identity of the wireless device 402 using a device identification number, such as but not limited to, a MAC ID, an IMEI, or an IMSI. Additionally or in the alternatively, the wireless device 402 identification may be based on an IPv6 address associated with the wireless device 402. Still, in such an aspect, it is the intermediate node 420 that may initiate the TCP connection on behalf of the wireless device 402. In an aspect, the intermediate node 420 may reside at a 1x base-station node and/or at a node where the PPP connection associated with the wireless device 402 terminates. Further, when the wireless device 402 subsequently communicates with service layer processing module 432 associated with network entity 430, the service layer processing module 432 may send an indication of successful completion (or otherwise) of the previous transaction submitted by the wireless device 402.

In another aspect, modem subsystem 414 may be configured to use multiple radios 416. In an aspect in which an intermediate node 420 is present in the network 400, then modem subsystem 414 may use a different radio 416 to establish a connection 419 with the intermediate node 420 than it uses to communicate (417, 423) with the network entity 430.

In still another aspect, service layer module 408 may include an application data buffer 412. In such an aspect, service layer module 408 may receive application data at a time when there is no connection established with the network entity 430. Subsequently, network entity 430 may send a request for data, as described above. In such an aspect, application processing subsystem 404 may obtain the requested data. Further, the request for data may include a network availability value and a flexible window within which wireless device 402 may respond. In such an aspect, the network availability value may indicate that the network entity 430 is available for communications and/or that the network connections (e.g., 417, 419, and 423) are sufficiently reliable, available, etc. Subsequently, service layer module 408 may transmit the requested data along with the buffered application data during the flexible transmission window.

FIGS. 5, 6, 7, and 10 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
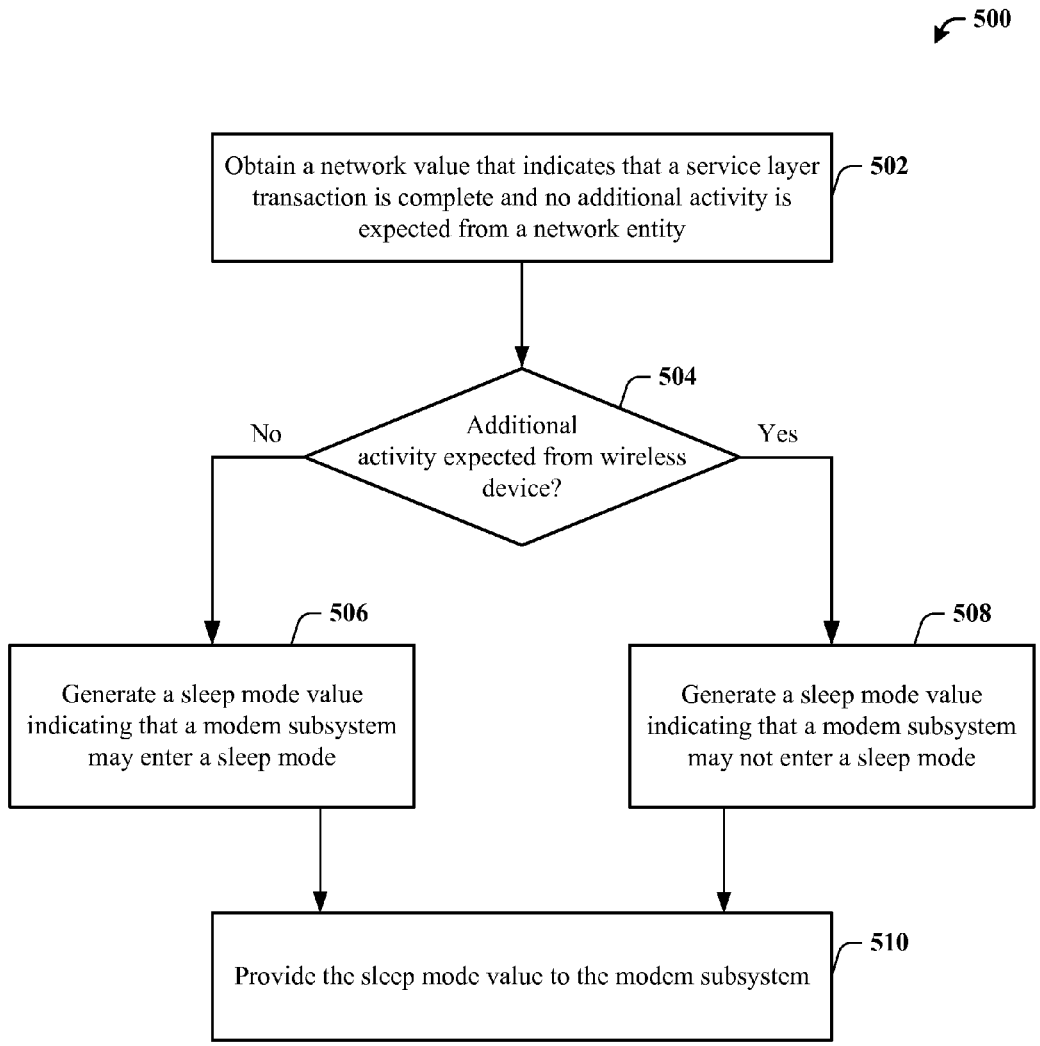
FIG. 5 is a flow chart illustrating a first example method for improving wireless device power consumption in an M2M environment, according to an aspect.

FIG. 5 depicts an example flowchart describing a first process 500 for efficient modem subsystem operations. In an aspect, the process 500 may be performed by a service layer module associated with a wireless device, an intermediate node, etc. (e.g., M2M end device, M2M gateway, or M2M client device, etc.).

At block 502, a service layer module may obtain a network value that indicates that a service layer transaction is complete. In an aspect, the indication may be a service layer packet data unit (PDU), from the service layer of an M2M network node, to the service layer at the wireless device, which indicates the end of a service layer transaction. In an aspect, the service layer PDU may include a source IP address (e.g., the m2m network node), a destination IP address of the wireless device being addressed, a transaction ID at the service layer, etc. In another aspect, the service layer PDU may further include service layer identifiers for the M2M network node and the wireless device, TCP/UDP port numbers associated with an application, etc. In an aspect, a hash of the service layer PDU data may be performed to verify the integrity of the data being exchange. In another aspect, the service layer PDU data may be encrypted using a session key (AES-based for example) associated with the exchange to ensure a secure delivery of the service layer PDU data. In an aspect, to further confirm that the transaction is complete, the service layer PDU may also include information whether any further requests from the network node would be forthcoming. If no further requests will be forthcoming, the service layer PDU could include this information. Additionally or in the alternatively, a separate PDU may be received indicating that another request or no other request would be forthcoming from the network node. Further, the wireless device may interpret the at least a portion of the received information to generate a network value (e.g., a "NetworkOK" signal with a boolean value of 1).

At block 504, the service layer module may determine whether any additional activity is expected from any subsystems associated with the wireless device. Where no additional activity is expected from the wireless device local, a local value may be set (e.g., a "LocalOK" signal with a boolean value of 1).

At block 504, where there is not further expected activity from both the network (e.g., NetworkOK=1) and the wireless device (e.g., LocalOK=1), then at block 506, a sleep mode value may be generated to indicate that a modem subsystem and/or application processing subsystem may enter a sleep mode (e.g., "ServiceLayerOK" signal with Boolean value of 1).

At block 504, where either of the local or network values indicates that addition activity is expected, then at block 508, a sleep mode value may be generated to indicate that a modem subsystem and/or application processing subsystem may not enter a sleep mode (e.g., "ServiceLayerOK" signal with Boolean value of 0).

At block 510, the sleep mode value may be provided to the modem subsystem and/or the application processing subsystem. In an aspect, sleep mode value may be communicated in a cross-layer message. In another aspect in which there is a separate applications processor subsystem associated with the modem subsystem for service layer processing, then the sleep mode value may also trigger that applications processing subsystem to enter a sleep mode. In an aspect, the modem subsystem may use other constraints, such as its own internal sleep timer, and wait for such timers to expire before entering the sleep mode. Similarly, an applications processing subsystem may have additional constraints such as waiting for other timers to expire or other gating signals to be asserted to then enter a sleep mode. In an aspect, the wireless device may generate the various values using hardware, firmware, software, etc. For example, the values may be communicated as inter-process communication (IPC) messages exchanged between the applications processing subsystem executing the service layer, and the modem subsystem and/or the communications processing subsystem that contains the wireless modem. In another aspect, the values may be written to registers in shared memory space accessible by the subsystems. For example, a common set of hardware registers that can be accessed by a service layer and the modem subsystem may be used. In such an aspect, 3 register bits can be used, with one-shot encoding to indicate service layer activity. Register 1 bit can indicate service layer task initiation which can enable the wireless modem to wake up to be ready to respond to an impending task to be submitted from the application layer. Register 2 bit can be used to indicate that the service layer needs that a task has been initiated and data has been communicated to the wireless modem. Register 3 bit can indicate a closure of all activity associated with a task to enable the wireless modem to go to sleep. If the wireless modem has a sleep timer that expires earlier than the Register 3 bit being set, then the wireless modem needs to wait for the Register 3 bit to be set, to allow the modem to shut down. If the Register 3 bit is set, and the wireless modem has a sleep timer that has not yet expired, then the wireless modem can wait until the sleep timer expires, and then go to sleep. This allows for the service layer middleware to determine whether end-to-end messaging has completed (for example that TCP acknowledgements have been received for data sent), to then set Register 3 bit to allow the wireless modem to go to sleep. The three settings may be 001—wakeup for data, 010—data task in progress, 100—data task completed. Additionally, a fourth bit can be used to indicate the type of transport protocol being used (e.g., TCP or UDP), so that the modem is aware of the differential capabilities of the transport protocol. This can be used when register 2 bit is set. 0100->UDP 0101->TCP.

Figure 6:
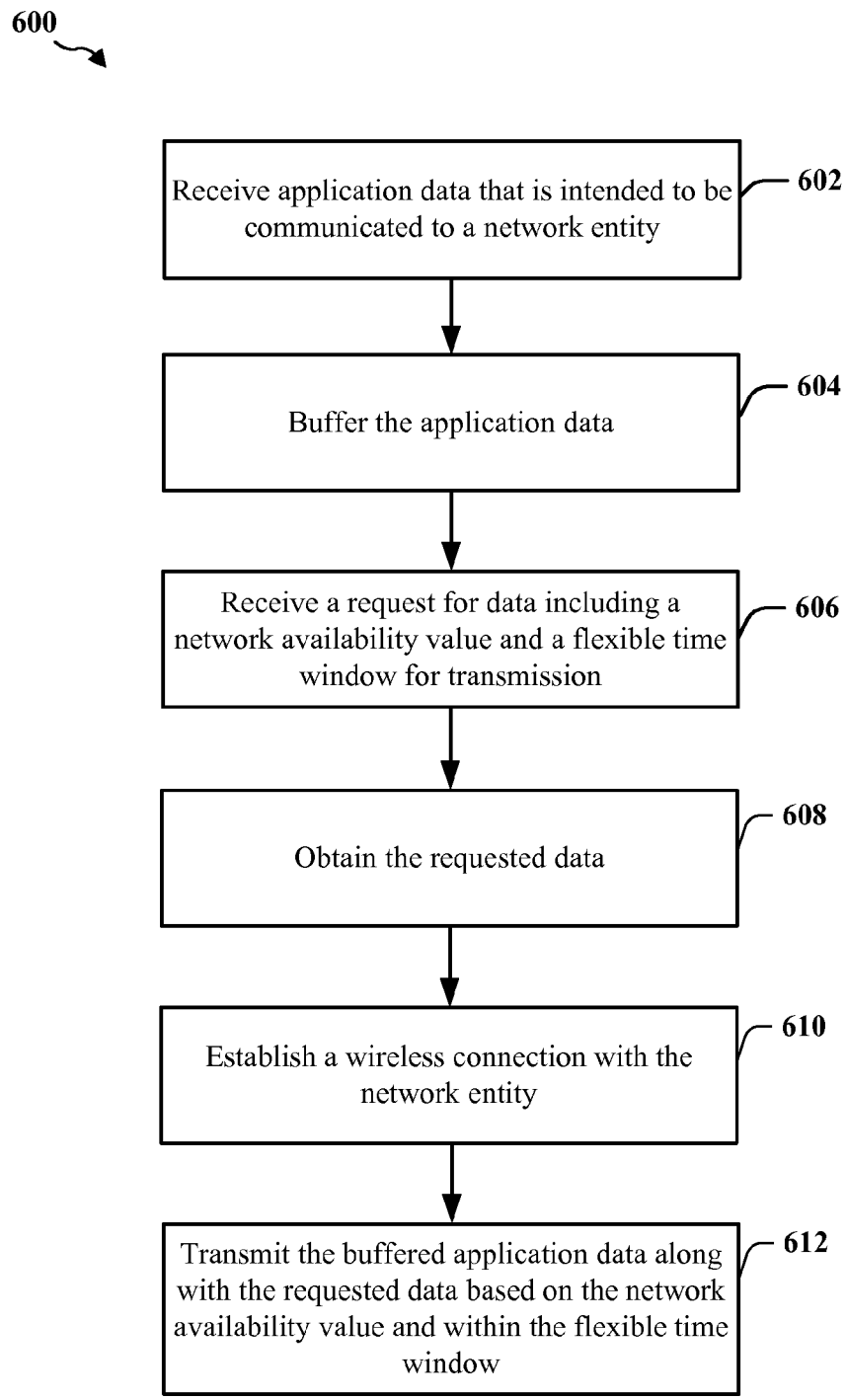
FIG. 6 is a flow chart illustrating a second example method for improving wireless device power consumption in an M2M environment, according to an aspect.

FIG. 6 depicts an example flowchart describing a second process 600 for efficient modem subsystem operations. In an aspect, the process 600 may be performed by a service layer module associated with a wireless device (e.g., M2M end device, M2M gateway, or M2M client device, etc.), an intermediate node, etc.

At block 602, the service layer module may receive application data that is intended to be communicated to a network entity. In such an aspect, the application data may be received from an application at a first time.

At block 604, the service layer module may include a buffer that may store the application data, and the application data may be buffered therein.

At block 606, at a second subsequent time, the service layer module may receive a request for data from a network entity. In an aspect, the request may include a network availability value and a flexible time window for transmission. In such an aspect, the network availability value may indicate that the network entity is available to receive the application data.

At block 608, the wireless device may obtain the requested data and provide the data to the service layer module. As noted above, the wireless device may obtain the requested data from one or more associated sensors and/or modules. Further, in an aspect in which the service layer module is associated with an entity other than the wireless device, the wireless device may use a different radio to communicate with the service layer module than may be used to communicate directly with another network entity.

At block 610, the service layer module may establish a wireless connection with the network entity. In an aspect, the connection may be a TCP connection, a UDP connection, etc.

At block 612, the service layer module may then transmit the requested data along with the buffered application data within the flexible transmission window.

Figure 7:
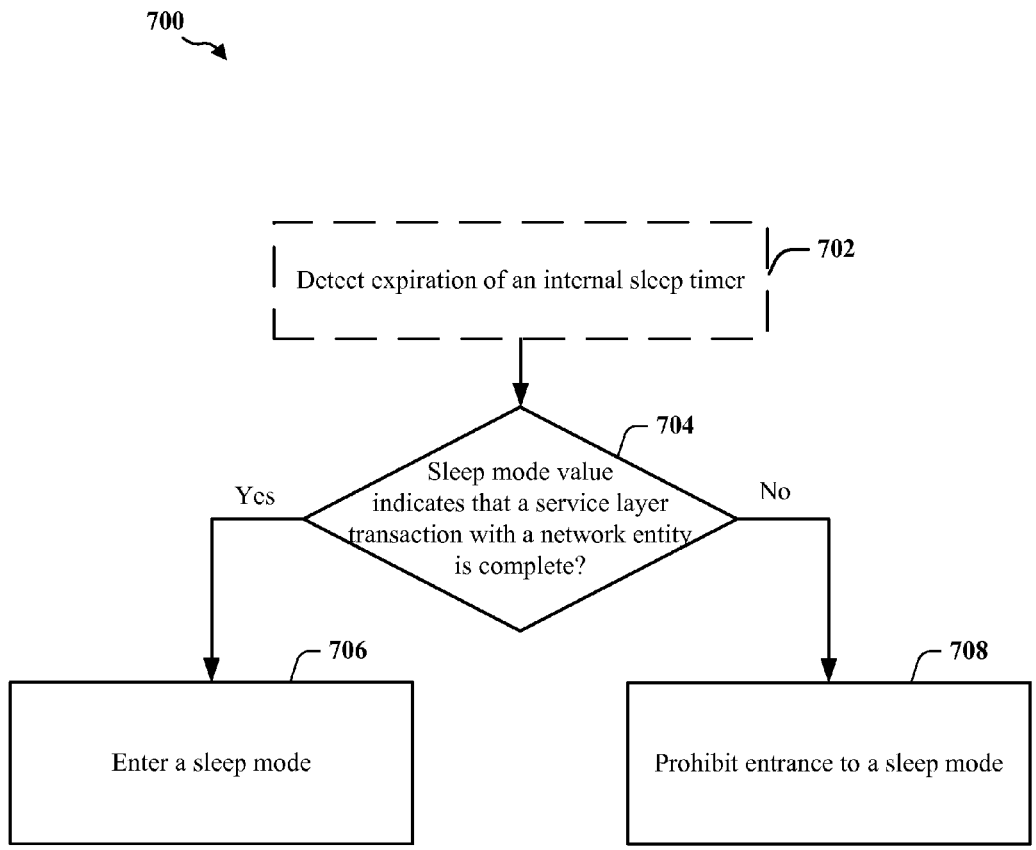
FIG. 7 is a flow chart illustrating a third example method for improving wireless device power consumption in an M2M environment, according to an aspect.

FIG. 7 depicts an example flowchart describing a third process 700 for efficient modem subsystem operations. In an aspect, the process 700 may be performed by a modem subsystem associated with a wireless device.

In an optional aspect, at block 702, a modem subsystem may determine that an internal sleep mode timer has expired.

At block 704, the modem subsystem may determine whether a sleep mode value indicates that a service layer transaction with a network entity is complete. In an aspect, the sleep mode value may indicate a service layer transaction with a network entity is complete and no additional activity associated with the service layer transaction is expected from an application. In an aspect, the sleep mode value may be accessible to the modem subsystem through a cross-layer message. In another aspect in which there is a separate applications processor subsystem associated with the modem subsystem for service layer processing, then the sleep mode value may also trigger that applications processing subsystem to enter a sleep mode. In an aspect, the sleep mode value may be written to registers in shared memory space accessible by the modem subsystem. For example, a common set of hardware registers that can be accessed by a service layer and the modem subsystem may be used. In such an aspect, 3 register bits can be used, with one-shot encoding to indicate service layer activity. Register 1 bit can indicate service layer task initiation which can enable the wireless modem to wake up to be ready to respond to an impending task to be submitted from the application layer. Register 2 bit can be used to indicate that the service layer needs that a task has been initiated and data has been communicated to the wireless modem. Register 3 bit can indicate a closure of all activity associated with a task to enable the wireless modem to go to sleep. The three settings may be 001—wakeup for data, 010—data task in progress, 100—data task completed.

If at block 704, the modem subsystem determines that the sleep mode value indicates that the service layer transaction is complete, then at block 706, the modem subsystem may enter a sleep mode. As noted in the optional aspect in block 704, the modem subsystem may use other constraints, such as its own internal sleep timer, and wait for such timers to expire before entering the sleep mode.

By contrast, if a block 704, the modem subsystem determines that the sleep mode value is set to indicate that the service layer transaction is not complete, then at block 708, the mode subsystem is prohibited from entering a sleep mode. In such, an aspect, even where an internal timer has expired, the modem subsystem may not enter the sleep mode.

Figure 8:
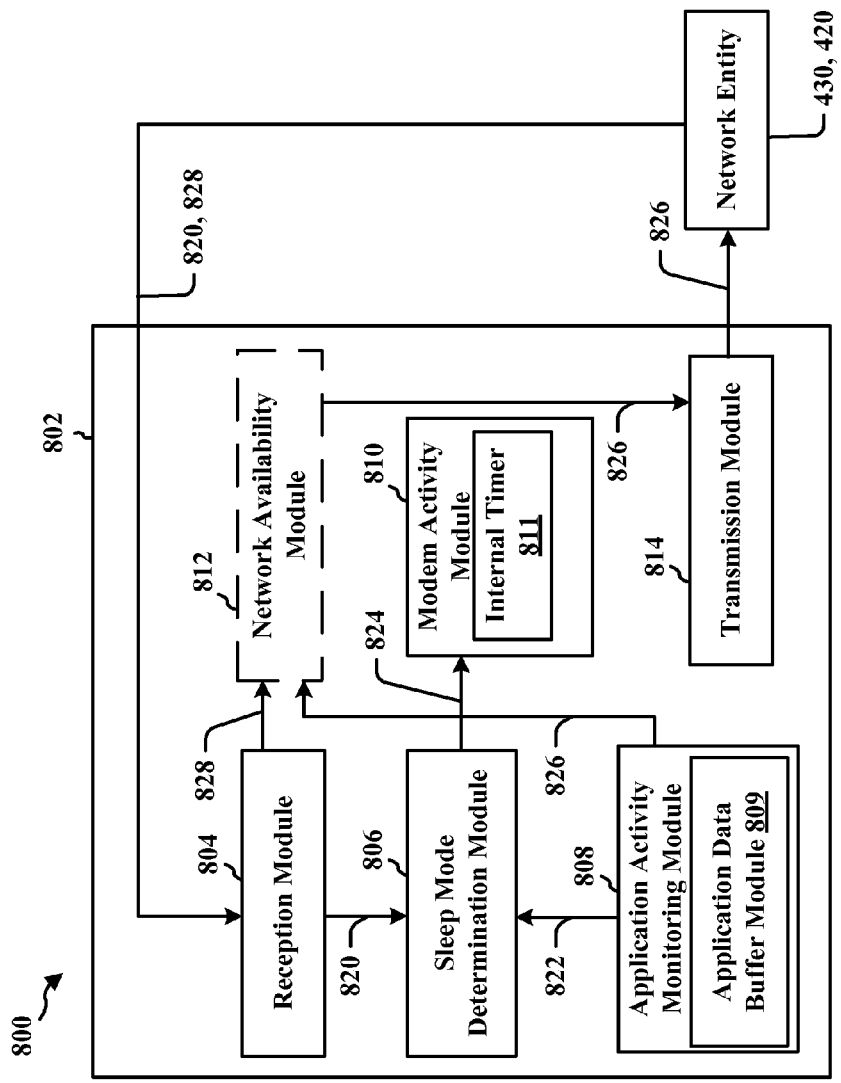
FIG. 8 is a conceptual data flow diagram illustrating the data flow between different modules/means/components in an exemplary apparatus.

FIG. 8 is a conceptual data flow diagram 800 illustrating the data flow between different modules/means/components in an exemplary apparatus 802. The apparatus may be a service layer module associated with a wireless device (e.g., M2M end device, M2M gateway, or M2M client device, etc.), an intermediate node, etc. The apparatus includes a reception module 804, a sleep mode determination module 806, an application activity monitoring module 808, a modem activity monitoring module 810 and a transmission module 814. In an optional aspect, apparatus 802 may also include a network availability module 812.

In an operational aspect, apparatus 802 (e.g., wireless device 402, intermediate node 420) may receive, through reception module 804, an network value 820 indicating that a service layer transaction is complete and no additional activity associated with the service layer transaction is expected from a network entity. Sleep mode determination module 806 may receive the network value 820 along with an indication 822 that no additional activity associated with the service layer transaction is expected from one or more applications from application activity monitoring module 808. Based on the network value 820 and the indication 822, sleep mode determination module may generate a sleep mode value 824. The sleep mode value 824 may be made available to modem activity module 810. In an aspect, the sleep mode value 824 may be made available through a common hardware register. In an aspect in which no additional activity is expected from the network entity 430 or any applications, then modem activity module 810 may read sleep mode value 824 to prompt a modem subsystem to enter a sleep mode. In another aspect, modem activity module 810 may check the sleep mode value 824 when an internal timer 811 has expired, and prohibit the modem subsystem from entering a sleep mode when the sleep mode value 824 indicates such a prohibition.

In another operational aspect, application activity module 808 may obtain data 826 from an application for transmission to a network entity 430. In such an aspect, the data 826 may be buffered in application data buffer 809. Further, reception module may receive a request for data 828 from a network entity 430. In such an aspect, the request for data 828 may include a network availability value with a flexible time window for transmission. In such an aspect, the network availability value indicates that the network entity 430 is available to receive the application data 826. In an optional aspect, the request for data including the network availability value and the flexible time window for transmission may be provided to network availability module 812. Further, after the requested data has been obtained, the buffered application data 826 along with the requested data may be transmitted to the network entity 430 using transmission module 814.

The apparatus may include additional modules that perform each of the steps of the algorithm in the aforementioned call flows and/or flow chart of FIGS. 5, 6, and 7. As such, each step in the aforementioned FIGS. 5, 6, and 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
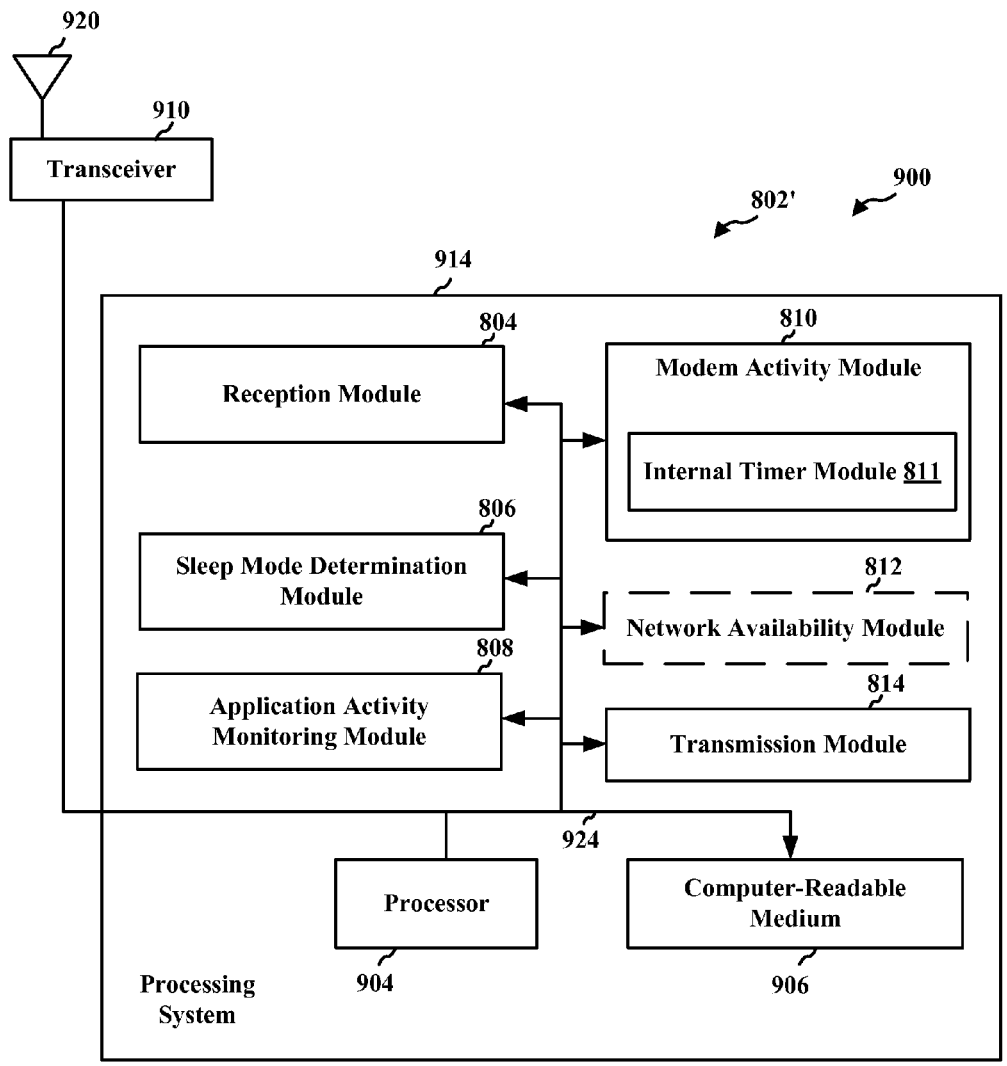
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, 812, 814, and the computer-readable medium 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software. The processing system further includes at least one of the modules 804, 806, 808, 810, 812, and 814. The modules may be software modules running in the processor 904, resident/stored in the computer-readable medium 906, one or more hardware modules coupled to the processor 904, or some combination thereof. In an aspect, the processing system 914 may be a component of the network entity 310 and may include the memory 376 and/or at least one of the TX processor 316, the RX processor 370, and the controller/processor 375. In another aspect, the processing system 914 may be a component of the UE 350 and may include the memory 360 and/or at least one of the TX processor 368, the RX processor 356, and the controller/processor 359.

In one configuration, the apparatus 802/802' for wireless communication includes means for obtaining, by a service layer module, a network value indicating that a service layer transaction is complete and no additional activity associated with the service layer transaction is expected from a network entity, means for determining whether additional activity associated with the service layer transaction is expected from one or more applications associated with a wireless device, means for generating a sleep mode value based on the reception of the network value and upon a determination that no additional activity associated with the service layer transaction is expected from the wireless device, and means for providing the sleep mode value to at least one of a modem subsystem or an application subsystem. In an aspect, the sleep mode value may indicate that the modem subsystem and/or the application subsystem are allowed to enter a sleep mode. In an aspect, the network value includes a boolean value set to 1. In an aspect, apparatus 802/802' means for obtaining may be further configured to receive a service layer packet data unit (PDU). In such an aspect the service layer PDU may include an address of the network entity, an address of the wireless device, a transaction ID associated with the service layer transaction, etc. Further, in such an aspect, the service layer PDU may include a service layer identifier for the network entity, a service layer identifier for the wireless device, one or more TCP/UDP port numbers for an application associated with the service layer transaction, etc. Still further, in such an aspect, the service layer PDU may be hashed to verify integrity, encrypted using a session key, or any combination thereof. In an aspect, apparatus 802/802' means for determining may be further configured to set a local value to indicate that the service layer transaction is complete and no additional activity associated with the service layer transaction is expected from the one or more applications associated with the wireless device. In such an aspect, the local value may be a boolean valet set to 1. Further, in such an aspect, the apparatus 802/802' means for generating may be configured to combine the network value and the local value to generate the sleep mode value. In an aspect, the apparatus 802/802' means for providing may be configured to update a value based on the sleep mode value in a register shared with the modem subsystem and/or the application subsystem. In such an aspect, the value in the register may indicate that a subsystem is to wake up for a data task processing, the data task is in progress, or the data task is complete. In another aspect, the value in the register may indicate a transport protocol associated with the data task.

In another configuration, the apparatus 802/802' for wireless communication includes means for determining whether a sleep mode value is set to allow the modem to enter a sleep mode, and means for entering the sleep mode upon a determination that the sleep mode value is set to allow the modem to enter the sleep mode. In an aspect, the sleep mode value may indicate a service layer transaction with a network entity is complete and no additional activity associated with the service layer transaction is expected from an application. In an aspect, apparatus 802/802' means for determining may be further configured to check a register for the sleep mode value. In such an aspect the sleep mode value in the register may indicate that a subsystem is to wake up for a data task processing, the data task is in progress, or the data task is complete. In an aspect, apparatus 802/802' means for determining may be further configured to determine whether an internal timer has expired. In such an aspect, apparatus 802/802' means for entering may be further configured to prohibit the modem from entering a sleep mode upon a determination that the sleep mode value is not set to allow the modem to enter the sleep mode.

In still another configuration, the apparatus 802/802' for wireless communication includes means for receiving, by an intermediate node, data associated with a service layer transaction, means for initiating a connection for transmission of the data to the network entity, and means for transmitting an indication to the wireless device that the data was reliably received, and the means for transmitting may be further configured to transmit the data to the network entity using the connection. In an aspect, the data is received from a wireless device and is intended for a network entity. In an aspect, the indication may allow a mode subsystem associated with the wireless device to enter a sleep mode. In an aspect, apparatus 802/802' means for transmitting may further be configured to include a wireless device identifier associated with the wireless device. In an aspect, apparatus 802/802' means for initiating may further be configured to determine an address of the network entity based on an address of the wireless device and a known relationship between the network entity and the wireless device. In another aspect, apparatus 802/802' means for initiating may further be configured to use an address of the intermediate node, and include a wireless device identifier associated with the wireless device.

As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. Further, as described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
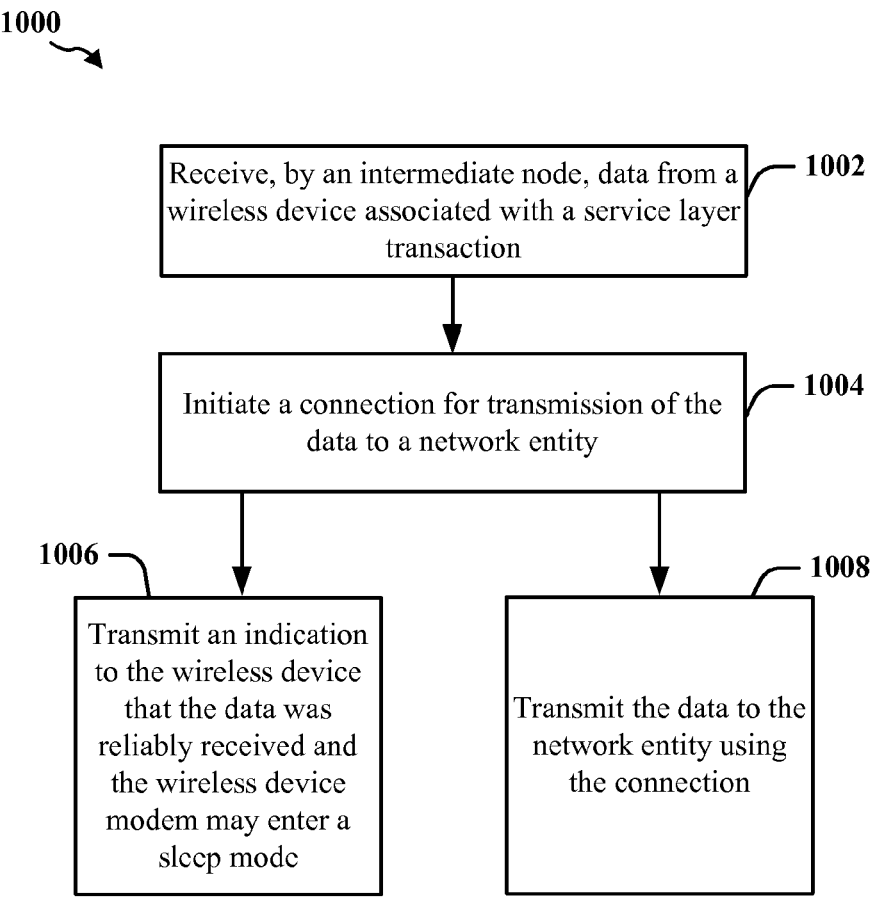
FIG. 10 is a flow chart illustrating a fourth example method for improving wireless device power consumption in an M2M environment, according to an aspect.

FIG. 10 is a flow chart of a fourth process 1000 of wireless communication. The method may be performed by an intermediate node (e.g., an AP, a femto node, a pico node, a nodeB, an eNodeB, a RNC).

At block 1002, the intermediate node may receive data from a wireless device. In an aspect, the data may be associated with a service layer transaction.

At block 1004, the intermediate node may initiate a connection with a network entity for transmission of the received data. In an aspect in which the connection is a TCP connection, the intermediate node may manage TCP retransmissions and ACKs with the network entity on behalf of the wireless device. In an aspect, the intermediate node may determine which network entity with which to communicate the data through use of information that is set up in advance. As such, when the wireless device provides data, then the intermediate node may set up an HTTP/TCP connection to set up/create a new entry in a database associated with that wireless device. In an aspect, the intermediate node may use its own IP address, and indicate the identity of the wireless device using a device identification number, such as but not limited to, a MAC ID, an IMEI, or an IMSI. Additionally or in the alternatively, the wireless device identification may be based on an IPv6 address associated with the wireless device 402. Still, in such an aspect, it is the intermediate node that may initiate the TCP connection on behalf of the wireless device.

At block 1006, the intermediate node may transmit an indication to the wireless device that the data was reliably received. In an aspect, the indication may further indicate to the wireless device that modem subsystem may enter a sleep mode. In an aspect, the indication that the data was reliably received may indicate that the data was reliably received by the intermediate node. In another aspect, the indication may further indicate that the data was reliably received by an intended network entity.

At block 1008, the intermediate node may transmit the data to the network entity using the initiated connection. In an aspect, the transmission may be TCP, UDP, etc., based.

Figure 11:
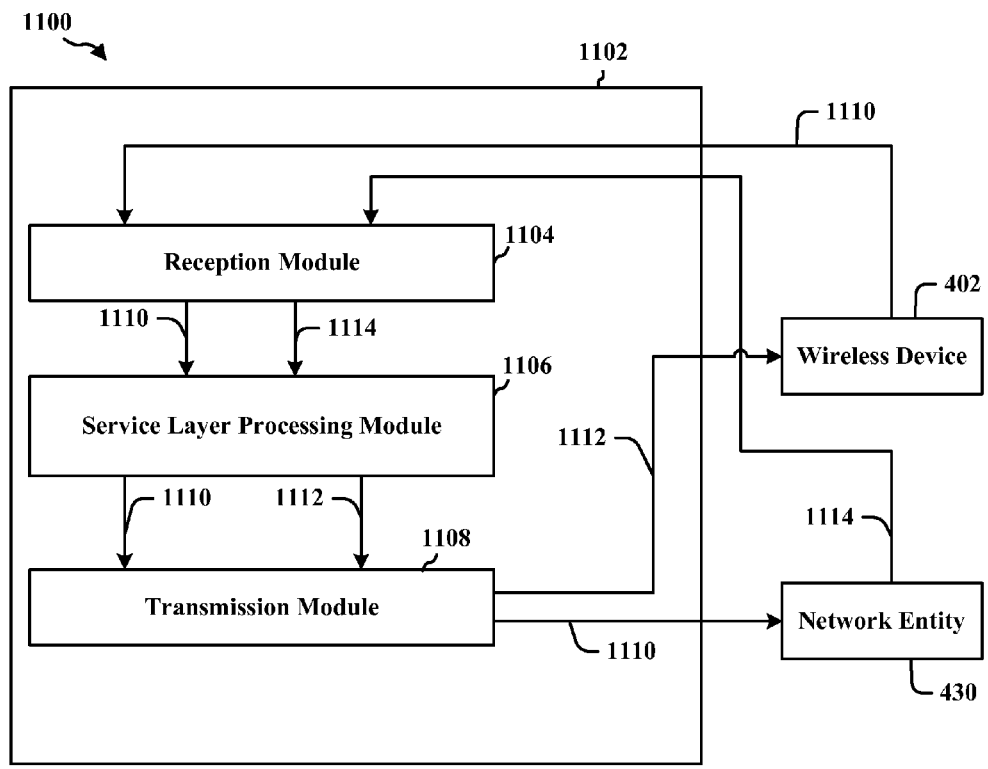
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a MSC. The apparatus 1102 includes a reception module 1104, a service layer processing module 1106, and a transmission module 908.

In an operational aspect, apparatus 1102 (e.g., intermediate node 420) may receive data 1110 from wireless device 402 at reception module 1104. Service layer processing module 1106 may process the received data. In an aspect, service layer processing module 1106 may generate an indication 1112 that the data was reliably received and may transmit the indication 1112 to wireless device 402 using transmission module 1108. In an aspect, the indication 1112 may also indicate to the wireless device 402 that a modem subsystem may enter a sleep mode. In another aspect, service layer processing module 1106 may initiate a connection (e.g., TCP, UDP, etc.) with network entity 430 through transmission module 1108 and may transmit the data 1110 to network entity 430. In an aspect, network entity 430 may respond with a message 1114 indicating successful reception of the data. In such an aspect, the message 114 may be received through reception module 1104 and processed by service layer processing module 1106 as part of the reliable reception indication 1112.

The apparatus may include additional modules that perform each of the steps of the algorithm in the aforementioned call flow and/or flow charts of FIG. 10. As such, each block in the aforementioned FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
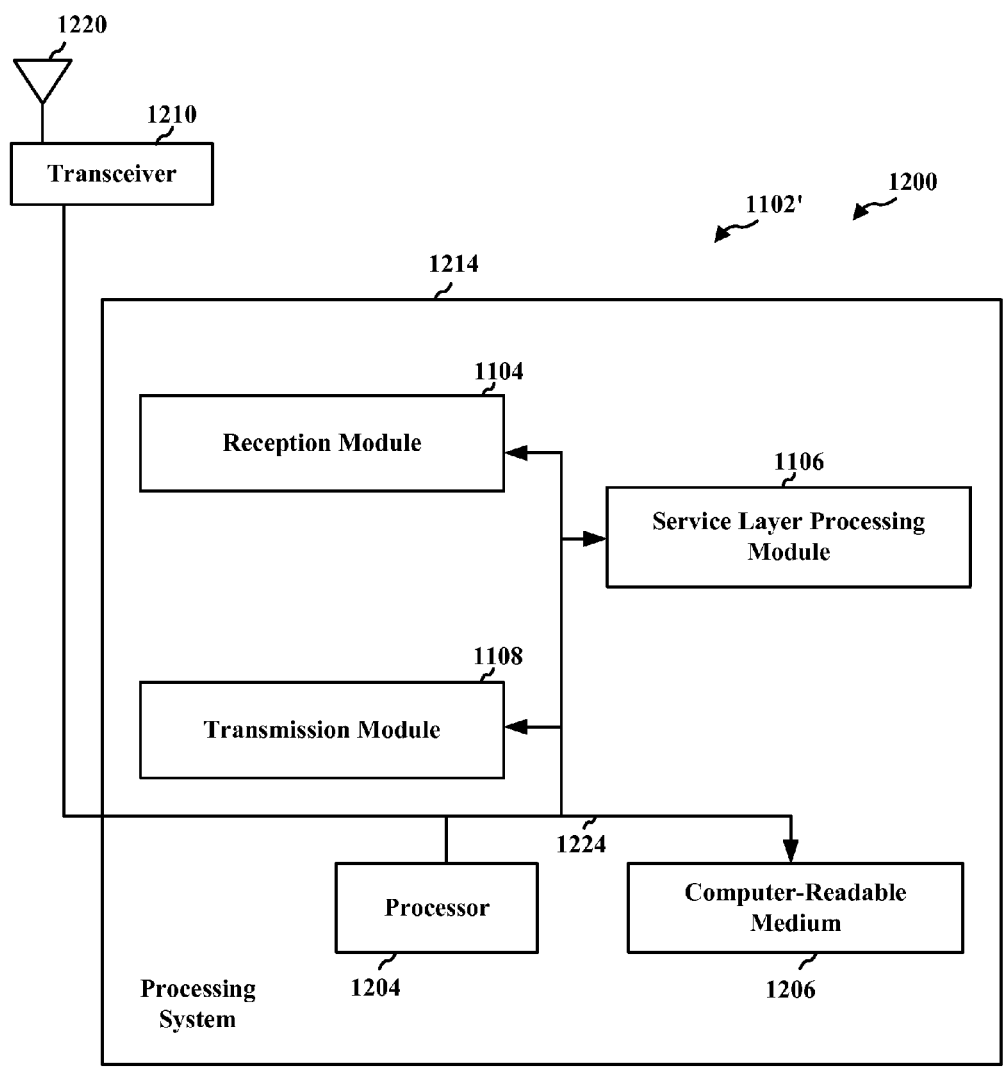
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, and 1108. The modules may be software modules running in the processor 1204, resident/stored in the computer-readable medium 1206, one or more hardware modules coupled to the processor 1204, or some combination thereof. The processing system 1214 may be a component of the network entity 310 and may include the memory 376 and/or at least one of the TX processor 316, the RX processor 370, and the controller/processor 375.

In one configuration, the apparatus 1102/1102' for wireless communication includes means for receiving, by an intermediate node, data associated with a service layer transaction, wherein the data is received from a wireless device and is intended for a network entity, means for initiating a connection for transmission of the data to the network entity, means for transmitting an indication to the wireless device that the data was reliably received, and where the means for transmitting may be further configured to transmit the data to the network entity using the connection. In an aspect, the indication may allow the wireless device modem to enter a sleep mode. In another aspect, the connection may be a TCP based connection, a UDP based connection, etc. In an aspect, apparatus 1102/1102' means for initiating may be configured to determine an address of the network entity based on an address of the wireless device and a known relationship between the network entity and the wireless device. In an aspect, apparatus 1102/1102' means for initiating may be configured to use an address of the intermediate node, and include a wireless device identifier associated with the wireless device. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 335. As such, in one configuration, the aforementioned means may be the TX Processor 316, the RX Processor 370, and the controller/processor 375 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications performed by a service layer module, comprising:
   obtaining a network value indicating that a service layer transaction is complete and no additional activity associated with the service layer transaction is expected from a network entity;

determining whether additional activity associated with the service layer transaction is expected from one or more applications associated with a wireless device;

generating a sleep mode value based on the network value and upon a determination that no additional activity associated with the service layer transaction is expected from the one or more applications associated with the wireless device; and providing the sleep mode value to at least one of a modem subsystem or an application subsystem, wherein the sleep mode value indicates that the at least one of the modem subsystem or the application subsystem is allowed to enter a sleep mode.

2. The method of claim 1, wherein the obtaining further comprises receiving a service layer packet data unit (PDU), and wherein the service layer PDU includes an address of the network entity, an address of the wireless device, and a transaction identifier (ID) associated with the service layer transaction.

3. The method of claim 2, wherein the service layer PDU further includes at least one of: a service layer identifier for the network entity, a service layer identifier for the wireless device, or one or more transmission control protocol/user datagram protocol (TCP/UDP) port numbers for an application associated with the service layer transaction.

4. The method of claim 2, wherein the service layer PDU is hashed to verify integrity, encrypted using a session key, or any combination thereof.

5. The method of claim 1, wherein the network value comprises a boolean value set to 1.

6. The method of claim 1, wherein the determining further comprises setting a local value to indicate that the service layer transaction is complete and no additional activity associated with the service layer transaction is expected from the one or more applications associated with the wireless device.

7. The method of claim 6, wherein the local value comprises a boolean value set to 1.

8. The method of claim 6, wherein the generating further comprises combining the network value and the local value to generate the sleep mode value.

9. The method of claim 1, wherein the network entity comprises at least one: an access point (AP), a femto node, a pico node, a nodeB, an eNodeB, a radio network controller (RNC), or any combination thereof.

10. The method of claim 1, wherein the network entity is an intermediate node that is configured to initiate a connection on behalf of the wireless device to assist with communication of data associated with the service layer transaction.

11. The method of claim 1, wherein the providing further comprises updating a value based on the sleep mode value in a register shared with at least one of the modem subsystem or the application subsystem.

12. The method of claim 11, wherein the sleep mode value in the register indicates that: a subsystem is to wake up for a data task processing, the data task is in progress, or the data task is complete.

13. The method of claim 12, wherein the sleep mode value in the register further indicates a transport protocol associated with the data task.

14. The method of claim 1, wherein the service layer module is associated with at least one of: the wireless device, or an intermediate node.

15. A method of communication for a modem, comprising:
determining whether a sleep mode value is set to allow the modem to enter a sleep mode, wherein the sleep mode value indicates a service layer transaction with a network entity is complete and no additional activity associated with the service layer transaction is expected from an application; and entering the sleep mode upon a determination that the sleep mode value is set to allow the modem to enter the sleep mode.

16. The method of claim 15, wherein the determining further comprising checking a register for the sleep mode value, wherein the sleep mode value in the register indicates that: a subsystem is to wake up for a data task processing, the data task is in progress, or the data task is complete.

17. The method of claim 15, wherein the determining further comprises:
determining that an internal sleep timer has expired, and wherein the entering the sleep mode is further based on the determination that the internal sleep timer has expired.

18. The method of claim 15, wherein the determining further comprises determining that an internal sleep timer has expired, further comprising prohibiting the modem from entering the sleep mode upon a determination that the sleep mode value is not set to allow the modem to enter the sleep mode.

19. An apparatus for communications, comprising:
means for obtaining a network value indicating that a service layer transaction is complete and no additional activity associated with the service layer transaction is expected from a network entity;

means for determining whether additional activity associated with the service layer transaction is expected from one or more applications associated with a wireless device;

means for generating a sleep mode value based on the network value and upon a determination that no additional activity associated with the service layer transaction is expected from the one or more applications associated with the wireless device; and means for providing the sleep mode value to at least one of a modem subsystem or an application subsystem, wherein the sleep mode value indicates that the at least one of the modem subsystem or the application subsystem is allowed to enter a sleep mode.

20. The apparatus of claim 19, wherein the means for obtaining is further configured to receive a service layer packet data unit (PDU), and wherein the service layer PDU includes an address of the network entity, an address of the wireless device, and a transaction identifier (ID) associated with the service layer transaction.

21. The apparatus of claim 20, wherein the service layer PDU further includes at least one of: a service layer identifier for the network entity, a service layer identifier for the wireless device, or one or more transmission control protocol/user datagram protocol (TCP/UDP) port numbers for an application associated with the service layer transaction.

22. The apparatus of claim 20, wherein the service layer PDU is hashed to verify integrity, encrypted using a session key, or any combination thereof.

23. The apparatus of claim 19, wherein the network value comprises a boolean value set to 1.

24. The apparatus of claim 19, wherein the means for determining is further configured to set a local value to indicate that the service layer transaction is complete and no additional activity associated with the service layer transaction is expected from the one or more applications associated with the wireless device.

25. The apparatus of claim 24, wherein the local value comprises a boolean value set to 1.

26. The apparatus of claim 24, wherein the means for generating is further configured to combine the network value and the local value to generate the sleep mode value.

27. The apparatus of claim 19, wherein the network entity comprises at least one:
an access point (AP), a femto node, a pico node, a nodeB, an eNodeB, a radio network controller (RNC), or any combination thereof.

28. The apparatus of claim 19, wherein the network entity is an intermediate node that is configured to initiate a connection on behalf of the wireless device to assist with communication of data associated with the service layer transaction.

29. The apparatus of claim 19, wherein the means for providing is further configured to update a value based on the sleep mode value in a register shared with at least one of the modem subsystem or the application subsystem.

30. The apparatus of claim 29, wherein the sleep mode value in the register indicates that: a subsystem is to wake up for a data task processing, the data task is in progress, or the data task is complete.

31. The apparatus of claim 30, wherein the sleep mode value in the register further indicates a transport protocol associated with the data task.

32. The apparatus of claim 19, wherein the apparatus is associated with at least one of: the wireless device, or an intermediate node.

33. An apparatus for communication, comprising:
means for determining whether a sleep mode value is set to allow a modem to enter a sleep mode, wherein the sleep mode value indicates a service layer transaction with a network entity is complete and no additional activity associated with the service layer transaction is expected from an application; and
means for entering the sleep mode upon a determination that the sleep mode value is set to allow the modem to enter the sleep mode.

34. The apparatus of claim 33, wherein the means for determining is further configured to check a register for the sleep mode value, wherein the sleep mode value in the register indicates that: a subsystem is to wake up for a data task processing, the data task is in progress, or the data task is complete.

35. The apparatus of claim 33, wherein the means for determining is further configured to determine that an internal sleep timer has expired, and wherein the means for entering the sleep mode is further based on the determination that the internal sleep timer has expired.

36. The apparatus of claim 33, wherein the means for determining is further configured to determine that an internal sleep timer has expired, wherein the means for entering is further configured to prohibit the modem from entering the sleep mode upon a determination that the sleep mode value is not set to allow the modem to enter the sleep mode.

37. An apparatus for communications, comprising:
a processing system configured to:
obtain a network value indicating that a service layer transaction is complete and no additional activity associated with the service layer transaction is expected from a network entity;
determine whether additional activity associated with the service layer transaction is expected from one or more applications associated with a wireless device;
generate a sleep mode value based on the network value and upon a determination that no additional activity associated with the service layer transaction is expected from the one or more applications associated with the wireless device; and
provide the sleep mode value to at least one of a modem subsystem or an application subsystem, wherein the sleep mode value indicates that the at least one of the modem subsystem or the application subsystem is allowed to enter a sleep mode.

38. The apparatus of claim 37, wherein the processing system is configured to receive a service layer packet data unit (PDU), and wherein the service layer PDU includes an address of the network entity, an address of the wireless device, and a transaction identifier (ID) associated with the service layer transaction.

39. The apparatus of claim 38, wherein the service layer PDU further includes at least one of: a service layer identifier for the network entity, a service layer identifier for the wireless device, or one or more transmission control protocol/user datagram protocol (TCP/UDP) port numbers for an application associated with the service layer transaction.

40. The apparatus of claim 38, wherein the service layer PDU is hashed to verify integrity, encrypted using a session key, or any combination thereof.

41. The apparatus of claim 37, wherein the network value comprises a boolean value set to 1.

42. The apparatus of claim 37, wherein the processing system is configured to set a local value to indicate that the service layer transaction is complete and no additional activity associated with the service layer transaction is expected from the one or more applications associated with the wireless device.

43. The apparatus of claim 42, wherein the local value comprises a boolean value set to 1.

44. The apparatus of claim 42, wherein the processing system is configured to combine the network value and the local value to generate the sleep mode value.

45. The apparatus of claim 37, wherein the network entity comprises at least one:
an access point (AP), a femto node, a pico node, a nodeB, an eNodeB, a radio network controller (RNC), or any combination thereof.

46. The apparatus of claim 37, wherein the network entity is an intermediate node that is configured to initiate a connection on behalf of the wireless device to assist with communication of data associated with the service layer transaction.

47. The apparatus of claim 37, wherein the processing system is configured to update a value based on the sleep mode value in a register shared with at least one of the modem subsystem or the application subsystem.

48. The apparatus of claim 47, wherein the sleep mode value in the register indicates that: a subsystem is to wake up for a data task processing, the data task is in progress, or the data task is complete.

49. The apparatus of claim 48, wherein the sleep mode value in the register further indicates a transport protocol associated with the data task.

50. The apparatus of claim 37, wherein the processing system is associated with at least one of: the wireless device, or an intermediate node.

51. An apparatus for communication, comprising:
a processing system configured to:
determine whether a sleep mode value is set to allow a modem to enter a sleep mode, wherein the sleep mode value indicates a service layer transaction with a network entity is complete and no additional activity associated with the service layer transaction is expected from an application; and
enter the sleep mode upon a determination that the sleep mode value is set to allow the modem to enter the sleep mode.

52. The apparatus of claim 51, wherein the processing system is configured to check a register for the sleep mode value, wherein the sleep mode value in the register indicates that: a subsystem is to wake up for a data task processing, the data task is in progress, or the data task is complete.

53. The apparatus of claim 51, wherein the processing system is configured to:
determine that an internal sleep timer has expired; and
enter the sleep mode is further based on the determination that the internal sleep timer has expired.

54. The apparatus of claim 51, wherein the processing system is configured to:
determine that an internal sleep timer has expired; and
prohibit the modem from entering the sleep mode upon a determination that the sleep mode value is not set to allow the modem to enter the sleep mode.

55. A non-transitory computer-readable medium comprising code for:
obtaining a network value indicating that a service layer transaction is complete and no additional activity associated with the service layer transaction is expected from a network entity;
determining whether additional activity associated with the service layer transaction is expected from one or more applications associated with a wireless device;
generating a sleep mode value based on the network value and upon a determination that no additional activity associated with the service layer transaction is expected from the one or more applications associated with the wireless device; and
providing the sleep mode value to at least one of a modem subsystem or an application subsystem, wherein the sleep mode value indicates that the at least one of the modem subsystem or the application subsystem is allowed to enter a sleep mode.

56. The non-transitory computer-readable medium of claim 55, further comprising code for receiving a service layer packet data unit (PDU), and wherein the service layer PDU includes an address of the network entity, an address of the wireless device, and a transaction identifier (ID) associated with the service layer transaction.

57. The non-transitory computer-readable medium of claim 56, wherein the service layer PDU further includes at least one of: a service layer identifier for the network entity, a service layer identifier for the wireless device, or one or more transmission control protocol / user datagram protocol (TCP/UDP) port numbers for an application associated with the service layer transaction.

58. The non-transitory computer-readable medium of claim 56, wherein the service layer PDU is hashed to verify integrity, encrypted using a session key, or any combination thereof.

59. The non-transitory computer-readable medium of claim 55, wherein the network value comprises a boolean value set to 1.

60. The non-transitory computer-readable medium of claim 55, further comprising code for setting a local value to indicate that the service layer transaction is complete and no additional activity associated with the service layer transaction is expected from the one or more applications associated with the wireless device.

61. The non-transitory computer-readable medium of claim 60, wherein the local value comprises a boolean value set to 1.

62. The non-transitory computer-readable medium of claim 60, further comprising code for combining the network value and the local value to generate the sleep mode value.

63. The non-transitory computer-readable medium of claim 55, wherein the network entity comprises at least one: an access point (AP), a femto node, a pico node, a nodeB, an eNodeB, a radio network controller (RNC), or any combination thereof.

64. The non-transitory computer-readable medium of claim 55, wherein the network entity is an intermediate node that is configured to initiate a connection on behalf of the wireless device to assist with communication of data associated with the service layer transaction.

65. The non-transitory computer-readable medium of claim 55, further comprising code for updating a value based on the sleep mode value in a register shared with at least one of the modem subsystem or the application subsystem.

66. The non-transitory computer-readable medium of claim 65, wherein the sleep mode value in the register indicates that: a subsystem is to wake up for a data task processing, the data task is in progress, or the data task is complete.

67. The non-transitory computer-readable medium of claim 66, wherein the sleep mode value in the register further indicates a transport protocol associated with the data task.

68. The non-transitory computer-readable medium of claim 55, wherein the non-transitory computer-readable medium is associated with at least one of: the wireless device, or an intermediate node.

69. A non-transitory computer-readable medium comprising code for:
determining whether a sleep mode value is set to allow a modem to enter a sleep mode, wherein the sleep mode value indicates a service layer transaction with a network entity is complete and no additional activity associated with the service layer transaction is expected from an application; and
entering the sleep mode upon a determination that the sleep mode value is set to allow the modem to enter the sleep mode.

70. The non-transitory computer-readable medium of claim 69, further comprising code for checking a register for the sleep mode value, wherein the sleep mode value in the register indicates that: a subsystem is to wake up for a data task processing, the data task is in progress, or the data task is complete.

71. The non-transitory computer-readable medium of claim 69, further comprising code for:
determining that an internal sleep timer has expired, and wherein the entering the sleep mode is further based on the determination that the internal sleep timer has expired.

72. The non-transitory computer-readable medium of claim 69, further comprising code for determining that an internal sleep timer has expired, further comprising prohibiting the modem from entering the sleep mode upon a determination that the sleep mode value is not set to allow the modem to enter the sleep mode.

* * * * *